Nov. 3, 1953
C. O. GLASGOW
2,657,760
HORIZONTAL SEPARATOR
Filed Jan. 9, 1950
4 Sheets-Sheet 1
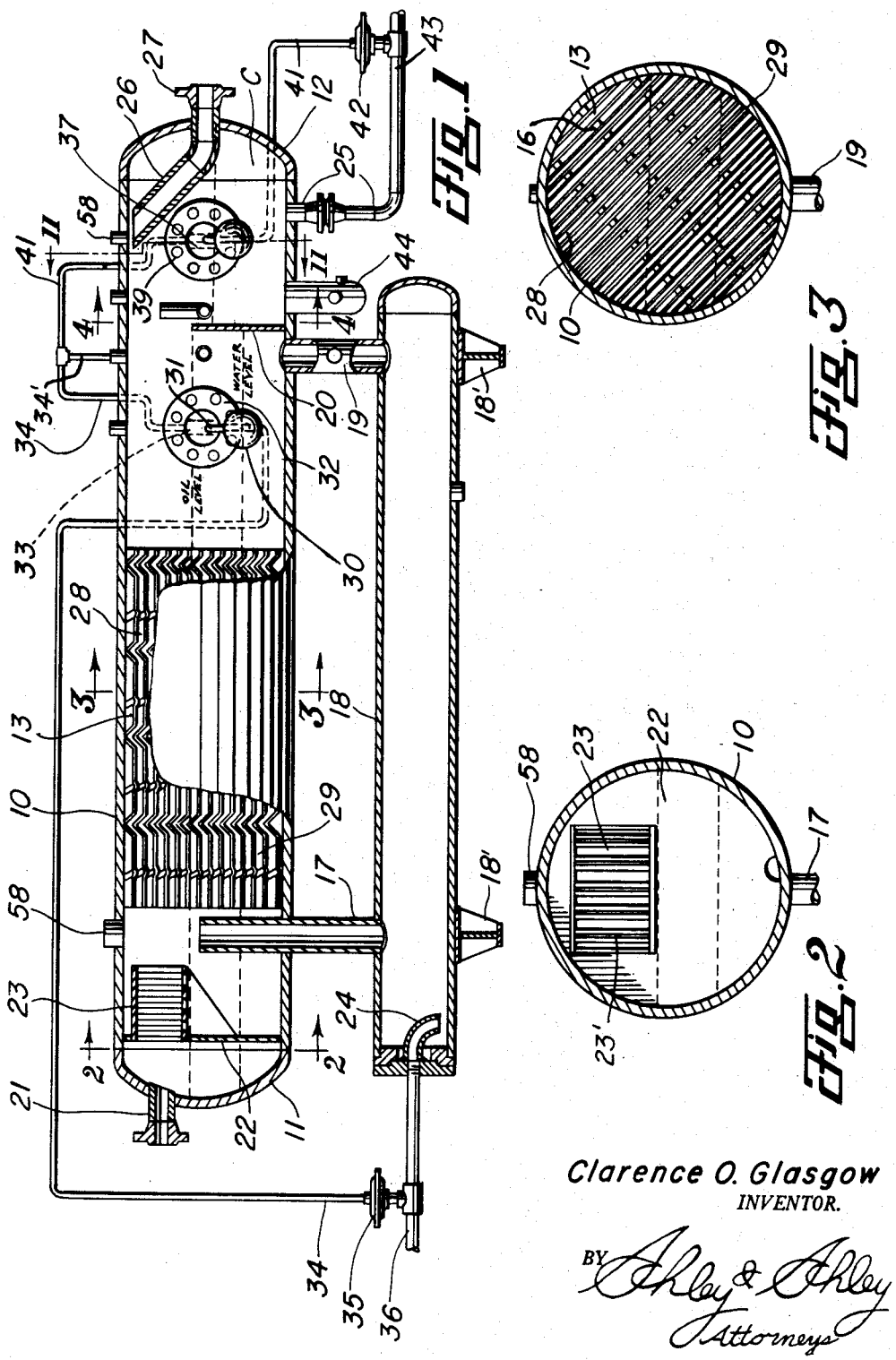
Clarence O. Glasgow
INVENTOR.
BY *Ashley & Ashley*
*Attorneys*

Nov. 3, 1953
C. O. GLASGOW
2,657,760
HORIZONTAL SEPARATOR
Filed Jan. 9, 1950
4 Sheets-Sheet 2
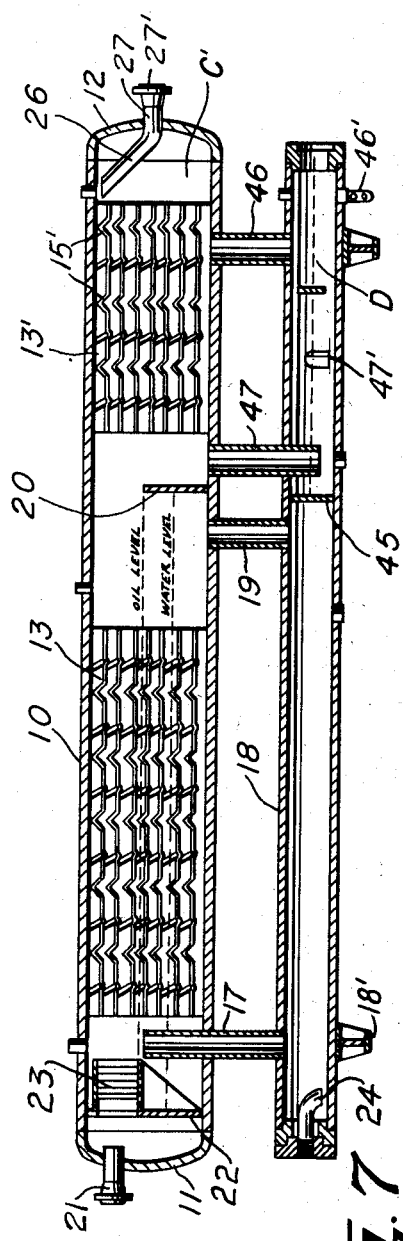
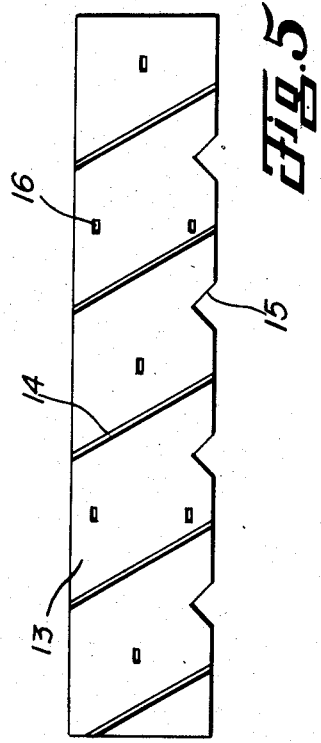
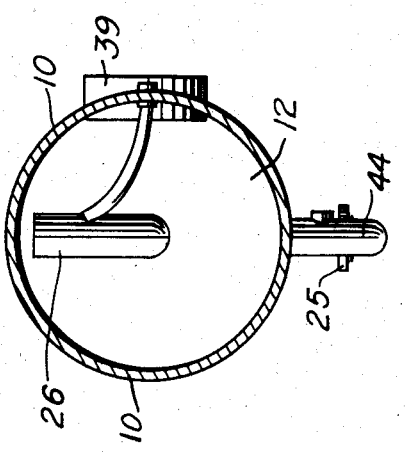
Clarence O. Glasgow
INVENTOR.
BY Nov. 3, 1953 C. O. GLASGOW 2,657,760
HORIZONTAL SEPARATOR
Filed Jan. 9, 1950 4 Sheets-Sheet 3

Clarence O. Glasgow
INVENTOR.

Nov. 3, 1953

C. O. GLASGOW 2,657,760

HORIZONTAL SEPARATOR

Filed Jan. 9, 1950

4 Sheets-Sheet 4

Clarence O. Glasgow
INVENTOR.

BY Ahley & Ahley
Attorneys

Patented Nov. 3, 1953

2,657,760

UNITED STATES PATENT OFFICE 2,657,760

HORIZONTAL SEPARATOR

Clarence O. Glasgow, Tulsa, Okla., assignor to National Tank Company, Tulsa, Okla., a corporation of Nevada Application January 9, 1950, Serial No. 137,547

15 Claims. (Cl. 183—2.7)

This invention relates to new and useful improvements in horizontal separators.

One object of the invention is to provide an improved horizontal separator especially adapted to handle well streams which include mixtures of oil, gas and water.

Another object of the invention is to provide an improved horizontal separator having a separating unit therein comprising ribbon-like flow passages extending through gas, oil and water zones or strata, whereby three complete separations are had which will insure substantially liquid-free gas, oil with the greatest percent of water removed that is possible without the addition of heat and chemical, and water that is free from oil entrainment.

A further object of the invention is to provide a separator of the character described having a partition over which the oil flows from the oil zone into an accumulating chamber, whereby a very constant level is maintained in the oil zone with little fluctuation and the oil may be withdrawn without disturbing the oil zone.

Still another object of the invention is to provide a separator of the character described having an underlying water leg connected thereto for obtaining a prolonged flow of the separated water, whereby any small particles of oil left or entrained in the water, may be separated and bubble up into the oil zone in the tank.

A construction designed to carry out the invention will be hereinafter described together with other features of the invention.

Figure 6:
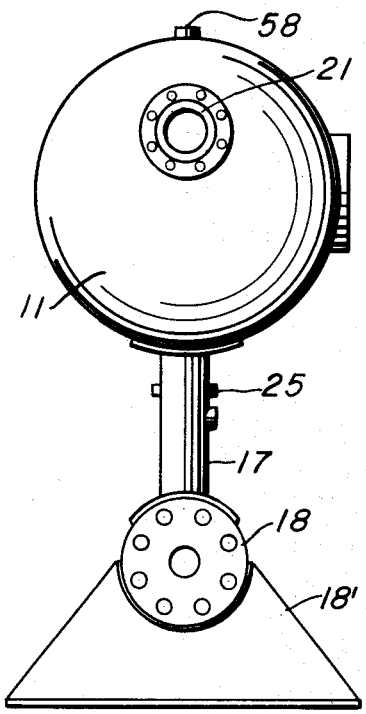
Figure 10:
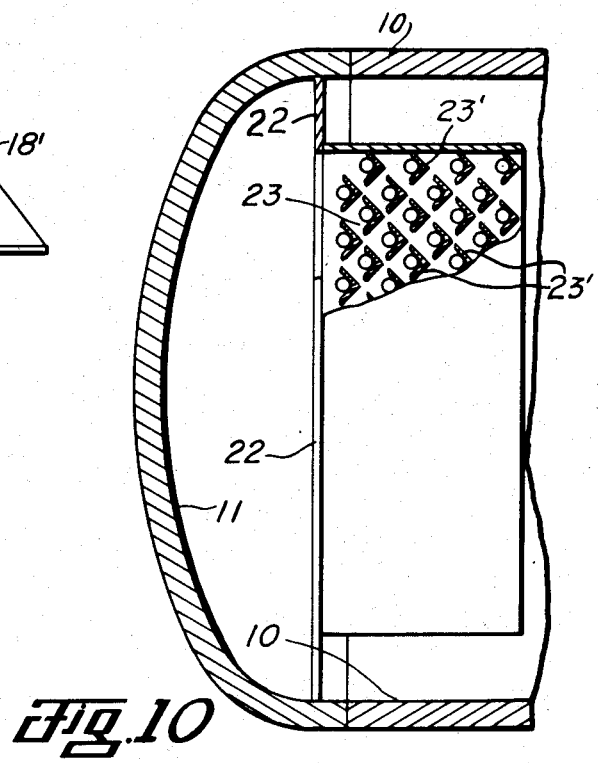
Figure 8:
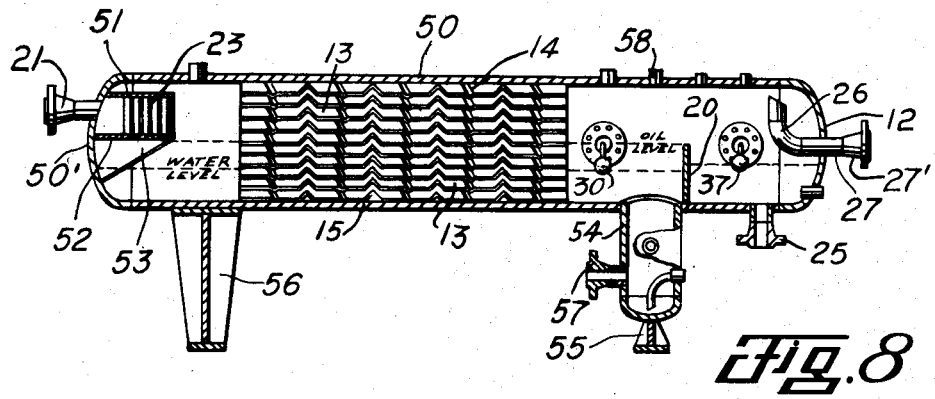
Figure 9:
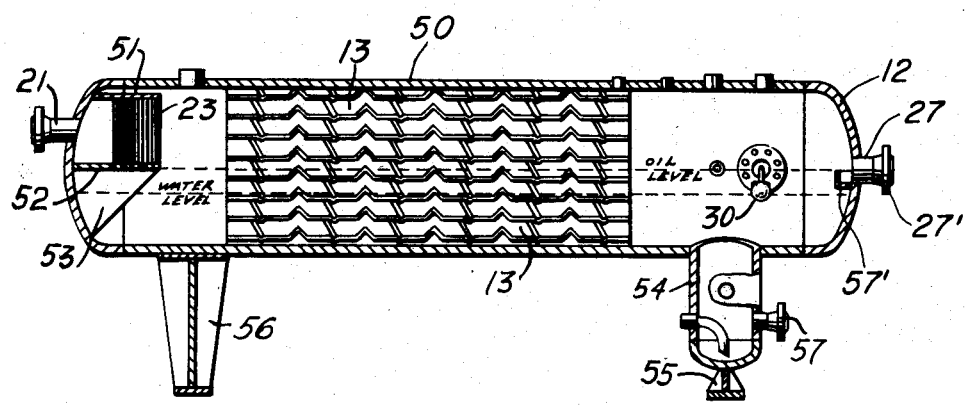
Figure 11:
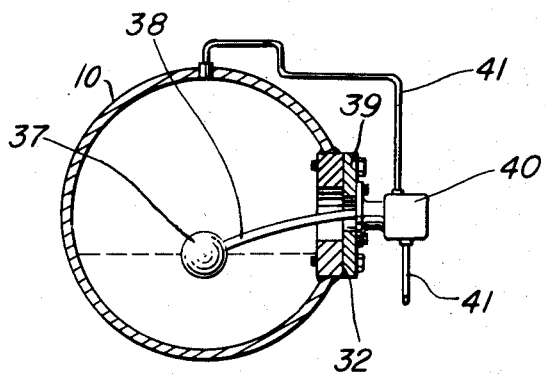

The invention will be more readily understood from a reading of the following specification and by reference to the accompanying drawings, wherein examples of the invention are shown, and wherein:

Fig. 1 is a longitudinal, vertical sectional view of a separator constructed in accordance with the invention, Figs. 2, 3 and 4 are horizontal cross-sectional views taken on their respective lines of Fig. 1, Fig. 5 is a plan view of one of the separator plates, Fig. 6 is a front end elevation of the separator, Fig. 7 is a longitudinal, vertical sectional view of a separator involving a modification of the invention, Figs. 8 and 9 are longitudinal, vertical sectional views involving modifications of the invention, Fig. 10 is a partial plan view of the bottom and vanes of the scrubber, and Fig. 11 is an enlarged cross-sectional view across the tank on the line 11—11 of Fig. 1.

In the drawings the numeral 10 designates an elongate cylindrical separating tank having crowned ends or heads 11 and 12, respectively, welded thereto, and within the tank is arranged a bundle of baffle or separator plates 13. These plates are disposed to incline downwardly at substantially an angle of 45° to the vertical axis of the tank and each plate has its upper and lower edges in contact with the inner surface of the tank wall. The plates are spaced in close relation and this spacing may vary. As an example, a spacing of 1/4 of an inch has been found satisfactory in some instances, where the bundle is approximately five feet long. As is shown best in Fig. 5 each plate is formed with a diagonal valley or duct 14, so that liquids precipitated from the fluid passing between adjacent plates, may be carried into these valleys and directed to the lower edge of the underlying plate. Each plate has notches 15 in its lower edges so that liquids flowing to the lower edge of the plate may discharge through the notches and reach the bottom of the tank. In order to insure proper spacing of the plates staggered spacing blocks 16 are secured on the upper face of each plate.

Immediately in front of the bundle of plates, an equalizing pipe 17 extends vertically down through the bottom of the tank and enters the top of the forward portion of a horizontal, cylindrical water leg or vessel 18. The upper end of the pipe 17 terminates at substantially midheight in the tank 10 at the oil level therein. The rear end of the storage vessel 18 has its top connected with the bottom of the tank 10 by a pipe 19, whereby liquids may flow down into said vessel and any gas or oil liberated in the vessel may flow up into the tank. Immediately in rear of the pipe 19, an upstanding, transverse partition 20 is secured across the tank and the upper edge of this partition constitutes a weir over which the oil flows and which determines the oil level forwardly of said partition.

As will be hereinafter explained, means is provided in the tank for maintaining a water level and a body or stratum of oil floats on the body of water, which water of course enters the vessel 18 through the pipe 19 and rises in the pipe 17. Any gas or oil liberated in the vessel 18, may bubble up through the pipe 17 and escape to the oil zone or the gas space above the oil zone. The pipes 17 and 19 act as standards or posts and support the tank 10 above the vessel 18. The vessel 18 is supported in cradles 18'.

A flanged inlet nipple 21 is secured in the upper portion of the head 11, above the oil level. Adjacent this head a transverse bulkhead 22 is secured to the annular wall of the tank and has mounted therein, the open front end of a liquid separator or scrubber 23. The scrubber is positioned opposite the inlet nipple and is supported above the oil level. The scrubber may be of any suitable construction, such as staggered, upright vanes 23', V-shaped in cross-section.

The influent which enters the tank through the nipple 21 may comprise, oil, water and gas. Since there are strata of oil and water in the tank, some of the lower plates of the bundle will be immersed in oil and those below will be immersed in water. The scrubber 23 functions to separate oil and water from the gas and these constituents discharge therefrom. The gas flows rearwardly between the plates 13 above the oil level; while the oil flows between the plates in the oil and the water flows between the plates in the water zone.

While the plates 13 in the gas zone function in a manner similar to that set forth in the Dixon Patent 2,349,944, the plates immersed in the oil and water zones are used somewhat differently. The plates being closely spaced form long, broad, shallow, or ribbon-like flow passages 28. The gaseous stream which enters these passages above the oil level will contain some liquid particles which gradually descend or fall downward and upon striking the plates, adhere thereto and accumulate thereon. The plates are spaced sufficiently close to each other and are of such length that the liquid particles or liquid-bearing bodies entrained in each gas stream, while traveling at a given velocity, will fall sufficiently to engage a plate surface before completing their passage through the plate bundle. Due to the difference in the density of the gas and liquid in the stream and also due to the fact that in the flow of this component mixture, the more dense, or liquid phase, particles will fall or descend downwardly at some velocity, it is manifest that by properly spacing the plates the liquid particles touch and adhere to a collecting surface before completing their travel through the separating element.

As the liquid particles accumulate on the surface of the plates, several particles agglomerate until the globules or bodies so formed, have sufficient weight to flow by gravity downwardly on these inclined surfaces and then through the notches 15 and down the tank wall to the oil level. It will be noted that in the present structure each plate has a high side and a low side with the notches along the lower edge.

The ducts 14 which are located between the notches 15 serve to prevent the gas stream from rolling or propelling any of the liquid particles to the end of a plate. These ducts are spaced close enough to arrest the particles before they have travelled to any extent on the surface of the plate and conduct them to the lower edge of the plate from which they will escape through the notches. The gas which escapes from the passages 28 will flow along the rear end of the tank over the baffle 20 and escape by way of a pipe 26. Some of the liquid particles or bodies which are precipitated in the passages 28 may comprise oil or water or both and may have some gas in solution therein. These particles admixing with the oil will flow through the submerged passages 29 and also all of the oil and water separated in the extractor 22 will likewise flow through the passages 29. This is because the only liquid escape in front of the partition 20 is by way of the pipe 19. The close spacing of the plates will give a washing or scrubbing action whereby any globules containing gas will be broken and the gas thus released; oil will be separated from the water and water separated from the oil, each fluid seeking its own level. Oil precipitated into the water zone will bubble out and rise to the oil zone, while gas will bubble through both zones to the gas space above the oil level.

Some fluids, while of a gaseous nature, contain appreciable quantities of liquid, as for instance as much as two gallons of liquid to a thousand cubic feet of fluid. The liquid is finely dispersed in minute particles which are sufficiently heavy as to readily fall out in the scrubber 23. It is obvious that by passing the liquids through the passages 29 their structures are broken down to the point where oil, gas and water are efficiently separated. However, in some stubborn cases the water and oil are comingled to the extent that merely passing the liquids through the passageways 29 is insufficient and therefore further separation is had by carrying the liquids through the elongate path provided by the water leg or vessel 18. Any oil or gas or oil released in the water leg 18 will bubble up through the pipe 17 and escape in the tank 10.

In order to maintain a predetermined water level in the tank 10 in advance of the partition 20, a float 30 is mounted on a flexible arm 31 mounted in the side of said tank as is best shown in Fig. 1. This arm is supported at one end in a manway fixture 32 and has operating connection with a pilot valve 33, shown in dotted lines in Fig. 1. This valve is connected in a gas line 34 which extends from the top of the tank to a motor valve 35 connected to a water discharge pipe 36 attached to the elbow 24. The liquid level control which has been described, is shown conventionally and any suitable control may be used. Since the water level is determined by the escape of water from the water leg 18, the operation of the valves will be obvious. The vertical movement of the float 30 in accordance with the water level in the tank 10 in advance of the partition 20, in turn actuates the pilot valve 33 which controls the application of gas pressure to the motor valve 35. If the water level exceeds the desired maximum, the raising of the float 30 opens the valve 33 which, by control of gas pressure in the pipe 34, opens the valve 35 to permit drainage of water through the pipe 36. Downward movement of the float results in closing of the valve 35 in the usual manner. The gas flowing into the line 34 will be under sufficient pressure to operate the valve 35.

Oil which overflows the partition 20 is received in an accumulating chamber C and its level therein is controlled by a float 37 (Figs. 1 and 11) mounted on an arm 38 (similar to the arm carrying the float 30) extending from a fixture 39 and operating a pilot valve 40. The pilot valve 40 is connected in a gas line 41 leading to a motor valve 42 in an oil line 43 extending from an oil outlet 25. Any desired oil level may be carried in the chamber C. Since some water may be carried over the partition 20 with the oil, a water trap 44 is mounted in the bottom of the chamber C and the accumulated water or other sediment may be periodically bled off.

The feature of flowing the oil and water through the elongate ribbon-like passage 29 is quite advantageous, as well as important. This type of separator is adapted to types of crude wherein the components are difficult of separation. The oil flowing through the passages 29 in the oil zone may have both gas and water dispersed therethrough and in suspension. The scrubbing action afforded through these broad, long passages, whereby the oil flows in ribbon-like streams, causes scrubbing out of the water globules which coalesce and agglomerate in bodies large enough to flow down into the water zone. The gas is liberated and bubbles up into the gas passages. In the water passages gas is liberated and oil is coalesced and bubbles up through the openings 15 into the oil-zone passages. The length and diameter of the water leg 18 is such that the water flows slowly therethrough to the outlet 24. This gives any oil remaining in the water an opportunity to bubble out and escape up through the pipe 17.

In Fig. 7 another form of separator is illustrated which in many respects is similar to the form set forth in Figs. 1 through 6. The elements which are approximately duplicated, will be indicated by the same reference numerals and letters as are employed in Figs. 1 through 6. The tank 10 and leg 18 are lengthened so as to provide an elongate chamber C' in the rear end of the tank beyond the baffle 20. In this chamber C' the second bundle of separator or baffle plates 13' is arranged. The purpose of this form of separator is to provide a two-stage fluid separation because some of the gaseous products which pass through the first bundle of plates 13, may contain considerable quantities of liquids in suspension and it is desirable to extract these liquids before permitting the gas to escape by way of the pipe 26. Further, under some conditions, there may be intermixtures of gas, oil and water in the fluids delivered to the chamber C'. The rear portion of the leg 18 is separated from the forward portion by a bulkhead 45 whereby a rear chamber or liquid leg D is formed in the leg 18. A discharge pipe 46 leads from the chamber C' from under the baffles 13' to the top of the chamber D and a pipe 47 leads from the lower portion of the chamber D to the bottom of the chamber C' in advance of the plates 13'.

The gas and gaseous fluids flowing rearwardly above the partition 20 pass between the plates 13', whereby entrained moisture in the form of oil or water, is separated and flows down the plates and through the openings 15'. Any liquids flowing over the weir at the top of the partition 20 into the chamber C' may pass down through the pipe 47 into the chamber D. Since the pipe 47 terminates near the bottom of the chamber, liquids will be discharged at this lower point. Thus, any water discharged downwardly through the pipe 47 would collect along the bottom of said chamber and may be bled off manually, as through the lower fitting 46'. The oil, which would constitute 90% to 99% of the liquid discharged, would float on the water stratum. Any gas released in the chamber D would go up through the pipe 46 to the gas space in the top of the chamber C'. It is obvious that an oil level may be carried at any desired elevation in chamber D by means of suitable controls, and oil drawn off through the outlet elbow 47'.

In Fig. 8 another form in which the invention may be carried out, is shown. A single tank 50, similar to the tank 10 is employed and where possible the same numerals and letters are used to designate elements approximately the same in structure as those previously described. The tank 50 has the inlet 21, and the scrubber 23 is substantially the same, except that its top and bottom plates 51 and 52 extend to the head 50'. The bottom plate in all forms is perforated, as is customary. The bulkhead 22 is omitted, but a bracket 53 is used to support the scrubber.

The bundle of plates 13 is installed in advance of the partition 20, but the leg 18 and pipes 17 and 19 are omitted. In place of the pipe 19, a cylindrical water trap 54 is used. The trap is mounted on a bolster 55 and the front end of the tank is carried on a standard 56. A water outlet 57 leads from one side of the trap. The oil and gas outlets are substantially the same as in Figs. 1 to 6.

In Fig. 9 still another type of separator, involving features of the invention, is set forth. The differences between this form and the separator shown in Fig. 8, are the elimination of the partition 20, the oil outlet 25 and the gas outlet 26. In Figs. 1, 7 and 8, the pipe 26 is connected to a horizontal nipple 27 welded in the rear head 12, with a flange 27' on the outer end of the nipple for connection with a gas line. This same head 12, nipple 27 and flange 27' are welded to the tank 50, in Fig. 9, except that the nipple is cut off flush with the inner surface of the head.

A skimming box 57' is mounted on the inner side of the head with its overflow edge on a level with the center of the nipple 27, whereby gas may escape through the upper portion of said nipple and oil through the lower portion thereof. This type of separator is used largely as a water knock out; however, oil separated from the gas when passing between the plates will not go back into a gaseous state even though a common discharge conductor is employed, unless the fluids are subjected to temperatures to cause gasification of said oil.

In all of the forms, the bottom plate, such as 52 in Figs. 8 and 9, has perforations at the bottoms of the vanes 23' of the scrubber, whereby liquids are free to flow down said vanes and readily discharge into the tank below the scrubber. It is not the purpose of the scrubber to separate oil and water, but primarily to extract liquids from the gas. The essential feature which is present in each type of separator is the three-fold separation carried out in the elongate passages between the plates 13, whereby gas is separated from the liquids in an upper zone; water separated from oil in an intermediate zone and oil separated from water in a bottom or lower zone. To this feature, the partition 20 and the oil accumulating chamber are added in some forms. In some of the types, the water leg is combined with the other features.

In some of the figures a plurality of collars 58 are welded in the top of the tank at various places. These collars are employed for connecting various appliances such as a safety head, a pressure gauge, a thermometer, safety valve and a non-freezing pilot regulator, or if it is desired to omit any of these appliances, the collars may be suitably plugged. Various other attachments common in this art may be mounted on the tank.

What I claim and desire to secure by Letters Patent is:

1. A fluid separator including, a horizontal tank having an influent inlet at one end and outlet means at its opposite end, a separating unit extending longitudinally in the tank between its ends, said unit comprising a plurality of closely-spaced substantially parallel plates extending transversely of the tank and elongated longitudinally of the tank to form a plurality of elongate wide shallow flow passages between said plates, devices connected with the tank at different elevations having discharge control means to maintain a water level and a water zone in the tank and an oil level and an oil zone above the water level, there being a gas zone above the oil level, the separating unit having a portion in the gas zone and portions immersed in the oil and water zones, whereby gas, oil and water are caused to flow separately through their respective zones and to flow longitudinally of the tank through the flow passages of the separating unit in separate superposed strata.

2. A fluid separator as set forth in claim 1, with an oil accumulating chamber in the tank beyond the oil and water zones.

3. A fluid separator as set forth in claim 1, with a water leg below the tank connected therewith.

4. A fluid separator as set forth in claim 1, with an oil accumulating chamber in the tank beyond the oil and water zones, and a water leg below the water zone of the tank connected therewith.

5. A fluid separator as set forth in claim 1, with a gas scrubber located in the tank adjacent to the inlet and in advance of the separating unit.

6. A fluid separator as set forth in claim 1, wherein the separator unit plates are inclined across the tank and have discharge notches along their lower edges.

7. A fluid separator as set forth in claim 1, wherein the separator unit occupies the entire cross-sectional area of the tank.

8. A fluid separator as set forth in claim 1, wherein the gas and oil are discharged through a common outlet.

9. A fluid separator including, a horizontal tank, an influent inlet at the front end of the tank, a gas outlet at the rear end of the tank, an oil outlet at the rear end of the tank, a separator unit in the tank intermediate the ends thereof comprising closely spaced substantially parallel plates extending transversely of the tank and elongated longitudinally of the tank forming wide shallow flow passages therebetween, a transverse partition in the tank between the unit and the oil outlet having a weir along its upper edge maintaining an oil level medially of the tank and unit, a water trap depending from the tank in advance of the partition having a water outlet, a valve controlling the discharge of water from said outlet, valve operating means connected with said valve, and level control means in the tank connected with said valve operating means maintaining a water level in said tank below the oil level in advance of said partition, the passages of the unit being located in the tank to conduct partially stratified gas and oil and water therethrough.

10. A fluid separator as set forth in claim 9, and a scrubber in the tank connected to the front end of the tank around the inlet to receive an influent therefrom.

11. A fluid separator including, a horizontal tank, an influent inlet at the front end of the tank, a separator unit in the tank intermediate the ends thereof comprising closely spaced substantially parallel plates extending diametrically across the tank and elongated longitudinally of said tank forming wide shallow flow passages therebetween, a water trap depending from the tank between the unit and the rear end of said tank, oil level control means at the rear end of the tank, an outlet in the rear end of the tank opposite the control means at an elevation to discharge both gas and oil, the trap having a water outlet, and discharge means connected with the water outlet having a liquid level control device in the tank maintaining a stratum of water therein, the separator unit extending from the upper portion of the tank downwardly through any oil therein into the water stratum whereby gas, oil and water flowing longitudinally of the tank are caused to pass through the flow passages of the separator unit in superposed strata.

12. A fluid separator including, a horizontal tank, an influent inlet at the front end of the tank above the center thereof, a separator unit in the tank intermediate the ends thereof comprising closely spaced plates extending diametrically of the tank and elongated longitudinally thereof forming ribbon-like flow passages between said plates, a transverse partition having a wier at its top maintaining an oil level in the tank, control means maintaining a water level in the tank below the oil level and in advance of said partition, a portion of the separator unit being immersed in oil and water, whereby oil and water zones are established in said separator and gas passages are provided above the oil level, a horizontal water leg spaced below the tank, upright pipes secured to the leg of the tank, one of said pipes terminating adjacent the oil level in the tank, the water leg having a water outlet at its front end, the partition forming an oil accumulating chamber in the rear of the tank, an oil outlet extending from said chamber, and a gas outlet extending from the tank above the oil level in the accumulating chamber.

13. A fluid separator as set forth in claim 12, with a scrubber supported in the tank above the oil level and opposite the influent inlet.

14. A fluid separator including, a horizontal tank, an influent inlet at the front end of the tank above the center thereof, a separator unit in the tank intermediate the ends thereof comprising closely spaced plates extending diametrically of the tank and elongated longitudinally thereof forming ribbon-like flow passages between said plates, a transverse partition having a wier at its top maintaining an oil level in the tank, control means maintaining a water level in the tank below the oil level and in advance of said partition, a portion of the separator unit being immersed in oil and water, whereby oil and water zones are established in said separator and gas passages are provided above the oil level, a horizontal water leg spaced below the tank, upright pipes secured to the leg and supporting the tank, one of said pipes terminating adjacent the oil level in the tank, the water leg having a water outlet at its front end, the partition in the tank forming a chamber in the rear portion of the tank, a second separating unit in said chamber, a water outlet connected with the tank in advance of the partition, control means maintaining a water zone in the tank extending through the unit therein, a gas outlet extending from the tank and a liquid outlet extending from the chamber at the rear portion of the tank.

15. A fluid separator as set forth in claim 14 wherein the water leg underlying the tank is connected with the water outlet from said tank, and a separate liquid leg connected with the liquid outlet of the tank chamber and having an outlet.

CLARENCE O. GLASGOW.

References Cited in the file of this patent

UNITED STATES PATENTS

| Number | Name | Date |
|---|---|---|
| 758,484 | Stewart | Apr. 26, 1904 |
| 1,516,132 | Allen et al. | Nov. 18, 1924 |
| 1,864,511 | Jones | June 21, 1932 |
| 1,910,728 | Waters | May 23, 1933 |
| 2,009,646 | Brady | July 30, 1935 |
| 2,084,958 | Hunter | June 22, 1937 |
| 2,179,131 | Millard | Nov. 7, 1939 |
| 2,349,944 | Dixon | May 30, 1944 |
| 2,525,154 | Taylor | Oct. 10, 1950 |
| 2,601,903 | Erwin | July 1, 1952 |